(12) United States Patent  
Kuether et al.

(10) Patent No.: US 8,782,711 B2  
(45) Date of Patent: Jul. 15, 2014

(54) SATELLITE TELEVISION NETWORK AND NEAR REAL-TIME METHOD FOR DOWNLOADING AND VERIFYING A SUBSCRIBER REMOTE RECORD REQUEST

(75) Inventors: David J. Kuether, Brea, CA (US); Philip R. Hilmes, Santa Monica, CA (US); Heang K. Lim, Covina, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1600 days.

(21) Appl. No.: 10/813,948

(22) Filed: Mar. 31, 2004

(65) Prior Publication Data

US 2005/0229212 A1    Oct. 13, 2005

(51) Int. Cl.
*H04N 5/445* (2011.01)
*H04N 7/16* (2011.01)
*H04N 7/20* (2006.01)

(52) U.S. Cl.
USPC .................................. 725/58; 725/25; 725/63

(58) Field of Classification Search
None
See application file for complete search history.

(56) References Cited

U.S. PATENT DOCUMENTS

| 5,646,603 | A | | 7/1997 | Nagata et al. | |
| 5,905,942 | A | * | 5/1999 | Stoel et al. | 725/78 |
| 6,311,058 | B1 | | 10/2001 | Wecker et al. | |
| 6,374,406 | B2 | * | 4/2002 | Hirata | 725/132 |
| 6,401,059 | B1 | | 6/2002 | Shen et al. | |
| 7,207,056 | B2 | * | 4/2007 | Wagner et al. | 725/110 |
| 7,281,261 | B2 | * | 10/2007 | Jaff et al. | 725/132 |
| 8,196,044 | B2 | * | 6/2012 | Barrett | 715/718 |
| 2002/0046404 | A1 | | 4/2002 | Mizutani | |
| 2002/0150387 | A1 | | 10/2002 | Kunii et al. | |
| 2003/0005448 | A1 | * | 1/2003 | Axelsson et al. | 725/58 |
| 2003/0009766 | A1 | * | 1/2003 | Marolda | 725/97 |
| 2004/0047599 | A1 | * | 3/2004 | Grzeczkowski | 386/83 |
| 2004/0083492 | A1 | * | 4/2004 | Goode et al. | 725/87 |
| 2004/0103434 | A1 | * | 5/2004 | Ellis | 725/58 |
| 2004/0187164 | A1 | * | 9/2004 | Kandasamy et al. | 725/132 |
| 2004/0210927 | A1 | * | 10/2004 | Bahr et al. | 725/30 |
| 2005/0028208 | A1 | * | 2/2005 | Ellis et al. | 725/58 |
| 2005/0050577 | A1 | * | 3/2005 | Westbrook et al. | 725/134 |

FOREIGN PATENT DOCUMENTS

GB          2388455 A   * 11/2003

* cited by examiner

*Primary Examiner* — Chris Parry

(57) ABSTRACT

Near real time downloading and verifying of a subscriber's remote record request is provided to control a DVR using the existing satellite network. The insertion of the programming request into the continuous broadcast stream enables near real time processing of the request by a subscriber IRD to accommodate same day and even last minute remote programming requests. The use of a back channel to verify the request provides the subscriber with assurance that the request has been processed successfully and flexibility to change services on the fly.

10 Claims, 11 Drawing Sheets

| | Request | IRD | Override | Validation |
|---|---|---|---|---|
| Program # | 123456 | 123456 | | Yes |
| Rating | G | G, PG, PG-13, R | | Yes |
| Service Code | 49 (Tennis CH) | 3, 10, 23, 49, 55 | | Yes |
| Billing Limit | $34.95 | $50 | Yes | Yes |
| Time | 1-4pm, Sunday | 3-5pm, | No | No |
| Memory Required | 1 Gb | 300 Mb | No | No |

|  | Request | IRD | Override | Validation |
|---|---|---|---|---|
| Program # | 123456 | 123456 |  | Yes |
| Rating | G | G, PG, PG-13, R |  | Yes |
| Service Code | 49 (Tennis CH) | 3, 10, 23, 49, 55 |  | Yes |
| Billing Limit | $34.95 | $50 | Yes | Yes |
| Time | 1-4pm, Sunday | 3-5pm, | Yes | Yes |
| Memory Required | 1 Gb | 300 Mb | Yes | Yes |

Fig. 6b

SATELLITE TELEVISION NETWORK AND NEAR REAL-TIME METHOD FOR DOWNLOADING AND VERIFYING A SUBSCRIBER REMOTE RECORD REQUEST

BACKGROUND OF THE INVENTION

1. Field of the Invention

This invention relates to satellite broadcast television, and more specifically to a near real time system and method for downloading and verifying a subscriber's remote record request via the satellite broadcast network to control a recording device such as a DVR or VCR.

2. Description of the Related Art

Satellite television programming has become widely available and has become a popular alternative to analog broadcast and cable services. Service providers such as DIRECTV® and EchoStar Communications Corp. under trademark DISH NETWORK provide a wide variety of programming. The basic architecture for a satellite television network 10 is illustrated in FIG. 1.

As shown in FIG. 1, a DIRECTV® Access system 10 includes four primary components; a satellite broadcast center (SBC) 12 that manages subscriber services and billing and stores and uplinks programming content and authorization data, one or more satellites 14 that broadcast the uplinked programming on a number of transponders, subscriber sites 16 that download and play selected programming and a back channel 18 such as the public switched telephone network for communicating billing information to the SBC through a "callback" function.

Satellite broadcast center 12 includes a video server 20 that receives video and associated audio services from a program provider(s) and converts them into separate audio and video packets that are stored in the server. These packets are of a fixed length and each has an identifier header which labels the type of packet, audio, video, CA, program guide, etc . . . .

A conditional access management center (CAMC) 24 receives (a) subscription information such as subscribed services, rating limits, and credit and billing limits from a subscriber service center 26, (b) subscriber programming selections during the "anniversary callback" or other special callbacks to report billing information and (c) current billing information including payment status, limits, etc. from a network billing center 28 and (a) sends new billing charges to billing center 28 and (b) generates Conditional Access (CA) packets 30 including audio/video encryption information, valid customer services, changed subscribed services, rating limits, credit limits etc. The CA packets 26 are assigned to a specific subscriber CAM, sometimes referred to as an Access Card.

A bridge router 32 is used to form multi-purpose transport (MPT) packets 34. These generic packets can be used for a variety of purposes, most typically to download software upgrades to the subscriber IRD. The packet includes a payload, e.g. the software upgrade, and a header that specifies the nature of the payload.

An uplink system 36 inserts a CA packet 30, an audio/video packet 22 or an MPT packet 34 into a transport packet that is inserted with other transport packets into an RF broadcast stream. The transport packet includes a payload, e.g. the A/V, CA or MPT packet, and a header that specifies the type of packet in the payload. A high power amplifier upconverts the RF signal to a higher frequency and power level, which is broadcast to the satellite via transmitter 38.

Subscriber site 16 includes a dish 40 where a low noise block downconverter amplifies the satellite signal and converts it to a lower frequency. This signal is then sent from the dish to the subscribers integrated receiver decoder (IRD) 42 where the individual transport packets are extracted from the RF signal. The IRD then routes the video and audio packets 22 to the audio and video decoders, the MPT packets 36 to the appropriate devices, and the CA packet 30 to a conditional access module (CAM) 44. The CAM determines if the subscriber is authorized to watch the program, and if they are, sends an authorization to decode the audio and video packets and direct them to a television 46 for viewing and/or a recording device 48 such as a VCR or digital video recorder (DVR) that provides many other interactive television recording features and services under trademarks TIVO and REPLAYTV.

The wide variety of programming available through digital satellite and cable services renders it likely that programs will be shown at times that are not convenient for a viewer. This, in turn, results in the desirability of recording such programs for later viewing at a more convenient time. Advanced models of satellite and cable receivers/decoders allow a subscriber to program the receiver to record a program for later viewing. The subscriber selects the program to be recorded from an on-screen program guide using a standard TV remote and the receiver sends IR or serial commands to the VCR or DVR to execute the recordings at the proper time. A subscriber may also connect from their home computer via the internet to a service center such as DIRECTV.com to access the program guide and select programming, review current billing information or even pay on-line.

If the subscriber purchases any pay per view events, this information is then stored on the CAM, and at predetermined intervals, the CAM will initiate a callback to the Conditional Access Management Center via the phone lines 18, where all of the subscriber's purchase information is transmitted. This purchase information is then sent to the Billing Center 28 where it gets processed for billing to the subscriber.

Television related products and services are available that greatly enhance the flexibility and capability of a standard video tape recorder (VTR) or DVR in conjunction with off air, cable or satellite broadcast programming. Tivo, Inc. offers subscription programming features under trademarks SEASON PASS and WISH LIST and Smart Recording features that record every episode of a selected program even if scheduling changes, find and record programming based on preferences and suggest programming based on viewing habits. Sonic Blue offers television recording services under trademark REPLAYTV with features that seamlessly removes all commercials from programming under trademark COMMERCIAL ADVANCE and features which allows a user, whether you are at work or on vacation, if you can get online, you can setup recordings, view your personal Channel Guide or Find Shows under trademark MYREPLAYTV. The record requests are downloaded once daily during the nightly "call back" that is made for billing purposes via a public phone line.

SUMMARY OF THE INVENTION

The present invention provides a near real time system and method for downloading and verifying a subscriber's remote record request to control a recording device such as a VCR, DVR or VTR using the existing satellite network.

To accomplish this, a subscriber logs into the satellite service provider's system and accesses an interactive program guide via the internet, WAP enabled cell phone, wireless personal digital assistant (PDA) or some other means. The subscriber selects a program to record and submits a remote record request that includes a program code and a subscriber ID. The programming request is sent to a satellite broadcast center for validation and insertion into a packet that is submitted to the center's uplink stream and then broadcast at near real time via satellite. This packet is addressed to target only the subscriber's integrated receiver decoder (IRD).

The subscriber's IRD receives the packet, extracts the programming information, determines whether the request is addressed to that IRD, performs a validation test to check for programming overlap, passwords and rating limitations. If all tests are passed, the program code is tagged for recording. At the selected time, the IRD tunes to the channel specified by the program code and the DVR records the event. In many systems the IRD is integrated as part of the DVR.

The IRD then sends a verification response to the subscriber via a back channel. The packet contains a setting that allows the IRD to call out through a phone line, DSL or cable modem via the IRD's modem or other communication port, e.g. USB or a connector under trademark FIREWIRE, to a subscriber utility or web site. The verification response confirms that the request has been successfully received or informs the subscriber that the request was denied or failed. In the latter case, the subscriber may be provided the opportunity to resolve a programming conflict, sign up for the requested service, increase a billing limit or change a rating limitation.

The insertion of the programming request into the continuous broadcast stream enables near real time processing of the request to accommodate same day and even last minute remote programming requests. The use of a back channel to verify the request provides the subscriber with assurance that the request has been processed successfully and flexibility to change services on the fly.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 5 is a diagram of a transport packet carrying an MPT packet with a remote record request; and FIGS. 6a and 6b are diagrams illustrating IRD validation of a request and control of the DVR.

DETAILED DESCRIPTION OF THE INVENTION

The present invention provides a near real time system and method for downloading a subscriber's remote record request to control a recording device and for sending a verification response to the subscriber using the existing satellite network.

Figure 1:
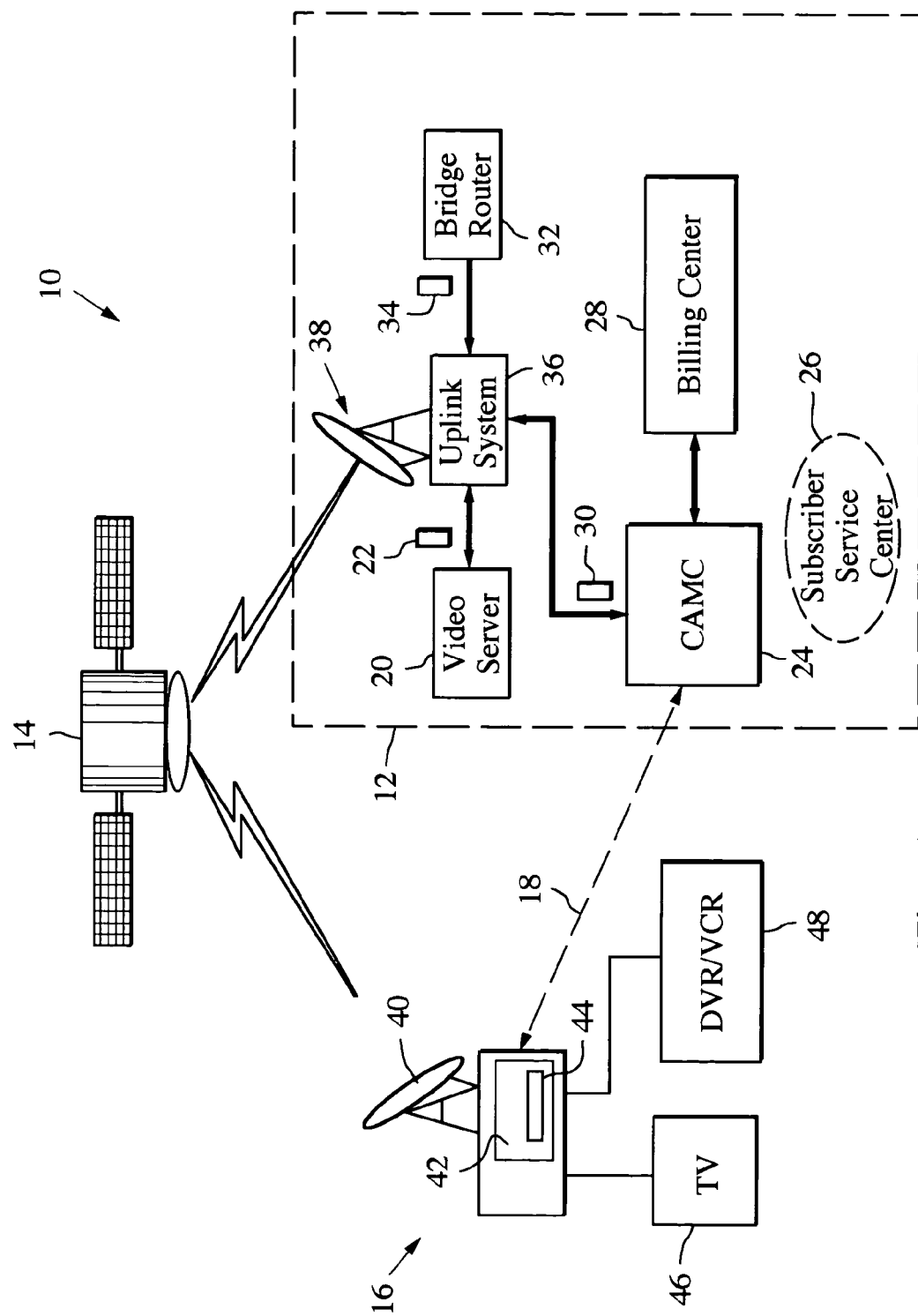
FIG. 1, as described above, is a block diagram of a satellite broadcasting system.
Figure 2:
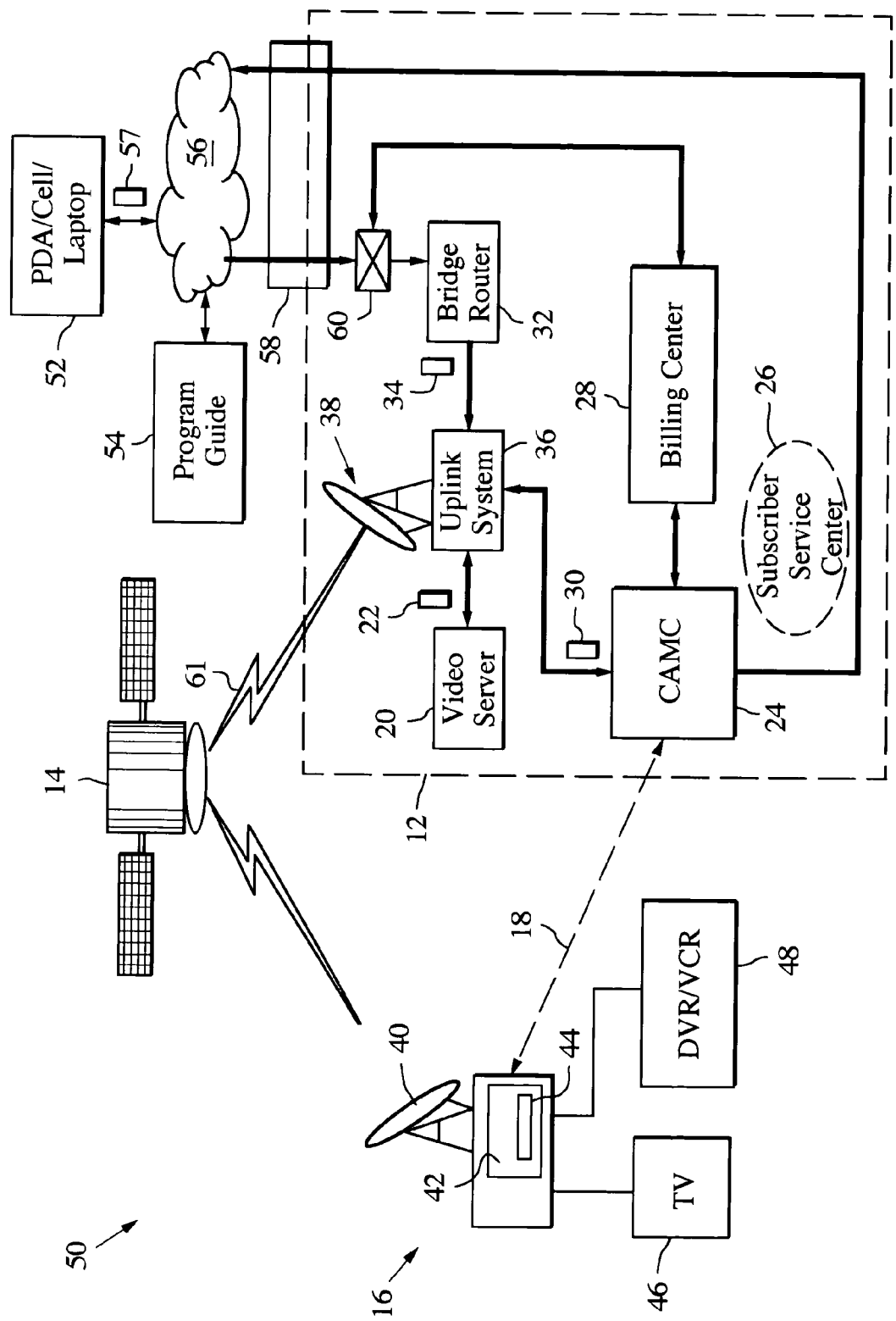
FIG. 2 is a block diagram of satellite broadcasting system for downloading and verifying a remote record request in accordance with the present invention.

Although the existing satellite network 10 shown in FIG. 1 lacks the capability to download and verify remote record requests, the capability can be provided in a satellite network 50 as shown in FIG. 2, in which like numbers are used for existing network components, with minimal modifications to the software and communication links.

A subscriber is provided with a personal communication device 52 such as a PDA, WAP enabled phone, palm phone, wired or wireless laptop computer. The subscriber logs into the satellite service provider's system and accesses an interactive program guide 54 via the internet, wireless network or some other means 56 to review and then select a program such as provided by DIRECTV.com. The subscriber issues a remote record request 57 that includes a program code and, generically, a subscriber ID, which can be the subscriber's account or other identifying number or a manufacturer's number for the subscriber's IRD or CAM.

The satellite broadcast center 12 is provided with a secure I/O port 58. The port serves as a "firewall" to ensure system integrity and enable communications between a remote subscriber and the satellite network via the internet, wireless network or some other means 56. For example, the port may be a website address to which all remote record requests are directed. A validation switch 60 is provided either in the port or, as shown here, between the port and bridge router 32. When presented with a remote record request, the validation switch 60 queries the billing center 28 or, alternately, the CAMC 24 to validate the request (service package, subscriber ID, billing limits, rating limits). If valid, the request is directed to the bridge router 32, which inserts the request information (program code, subscriber ID, override information) into an MPT packet 34. The MPT packet is forwarded to uplink system 36 where it is inserted into a transport packet and uplinked to satellite 14 for transmission in a broadcast stream 61.

At subscriber site 16, currently existing IRDs 42 although capable are not configured to execute a remote record request. Consequently, when a subscriber first signs up for the remote record request service, a software download (MPT packet) is sent to the subscriber's IRD to enable downloading, executing and verifying a remote record request. Next generation IRDs will most likely be configured to support this feature without such a patch.

Upon receipt of a transport packet carrying an MPT packet 34 with a remote record request, the properly configured IRD 42 determines that it is an MPT packet, decodes the packet and compares the subscriber ID information in the packet to similar ID information (manufacturer ID or subscriber ID) resident in the IRD to determine whether the remote record request is directed to that subscriber site. If not, the IRD ignores the request. If so, the IRD validates the request (no conflicts, enough memory, etc.) and tags the program code for recording, which in turn programs the recording device 48 to record the event. The IRD sends a verification response that the request was received and either executed or rejected and, if so, why via backchannel 18 to the CAMC 24, which forwards the response to the subscriber via the internet, wireless network or some other means 56. Alternately, the verification response can be sent via a different backchannel such as an ISP or, perhaps, directly to the subscriber, such as an e-mail, bypassing the SBC altogether.

Figure 3A:
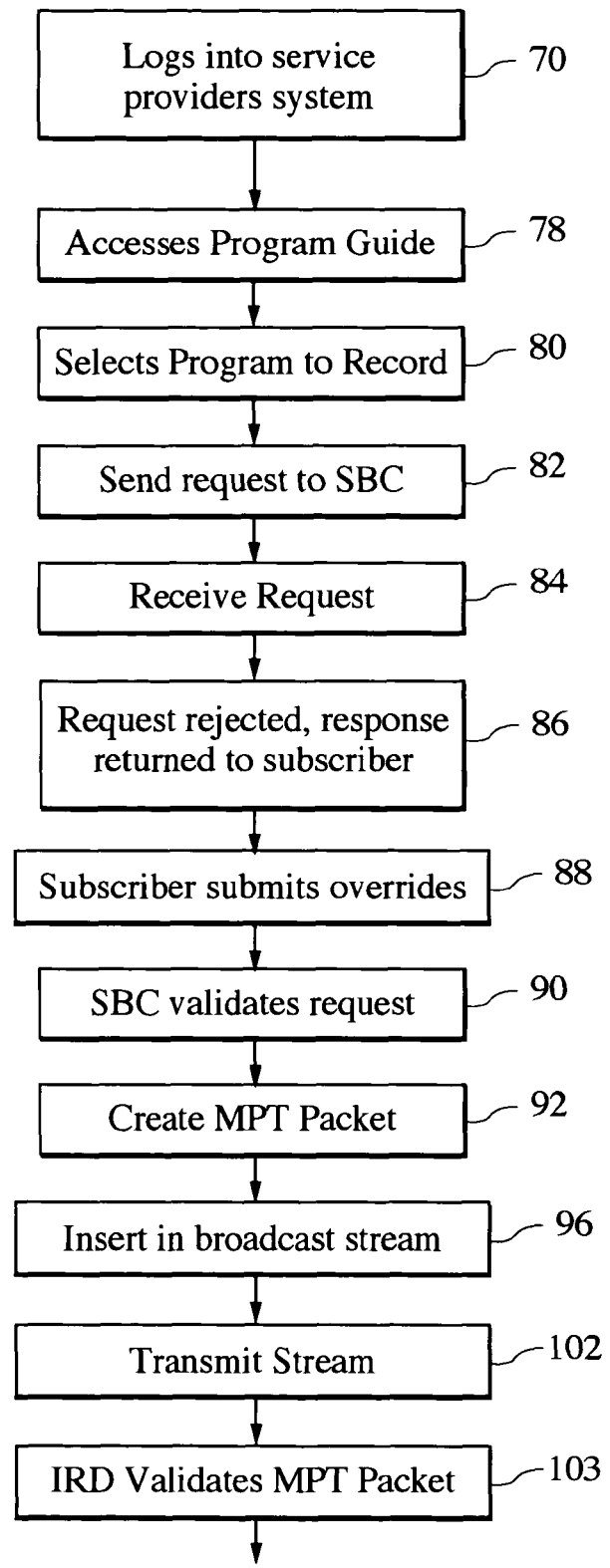
FIGS. 3a and 3b flowchart the steps for issuing, verifying and executing a remote record request.
Figure 3B:
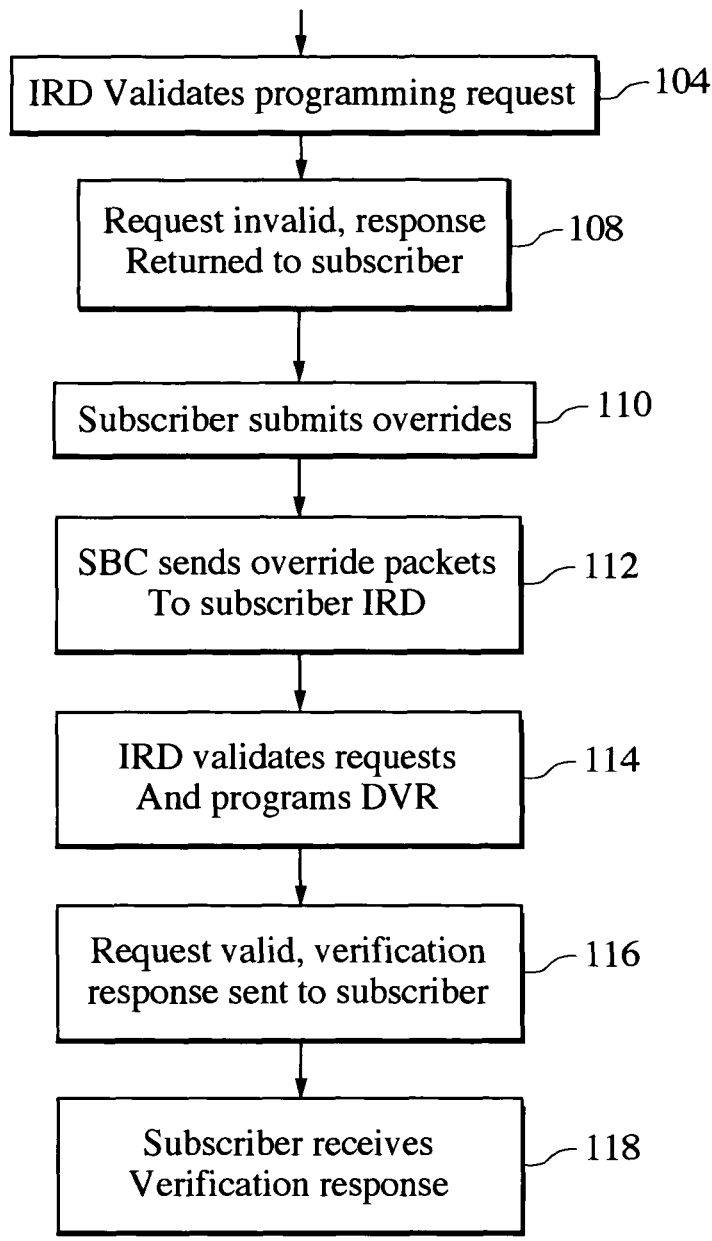
Figure 4A:
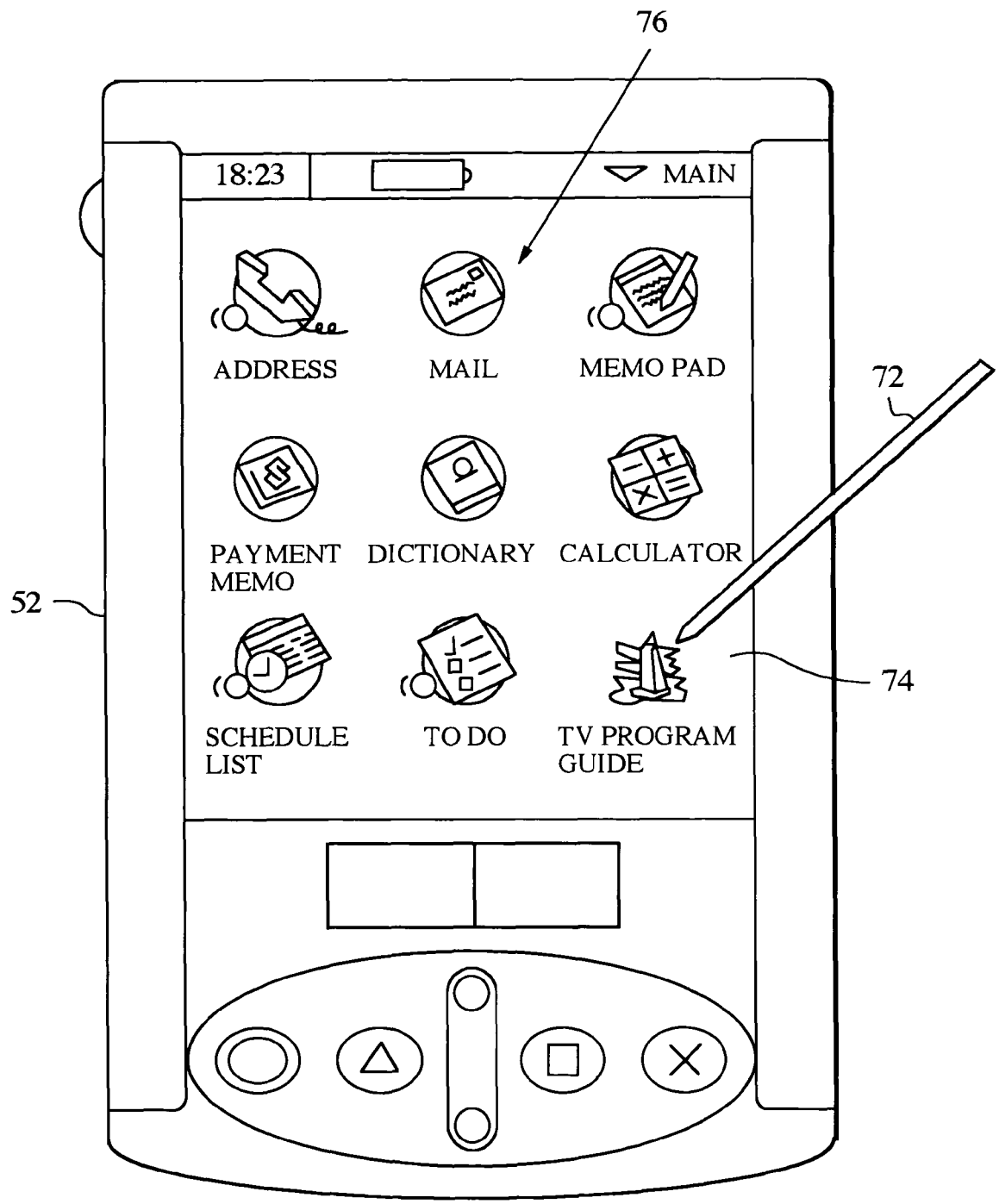
FIGS. 4a-4e are schematic views of a PDA screen displaying remote record request and verification messages.
Figure 4B:
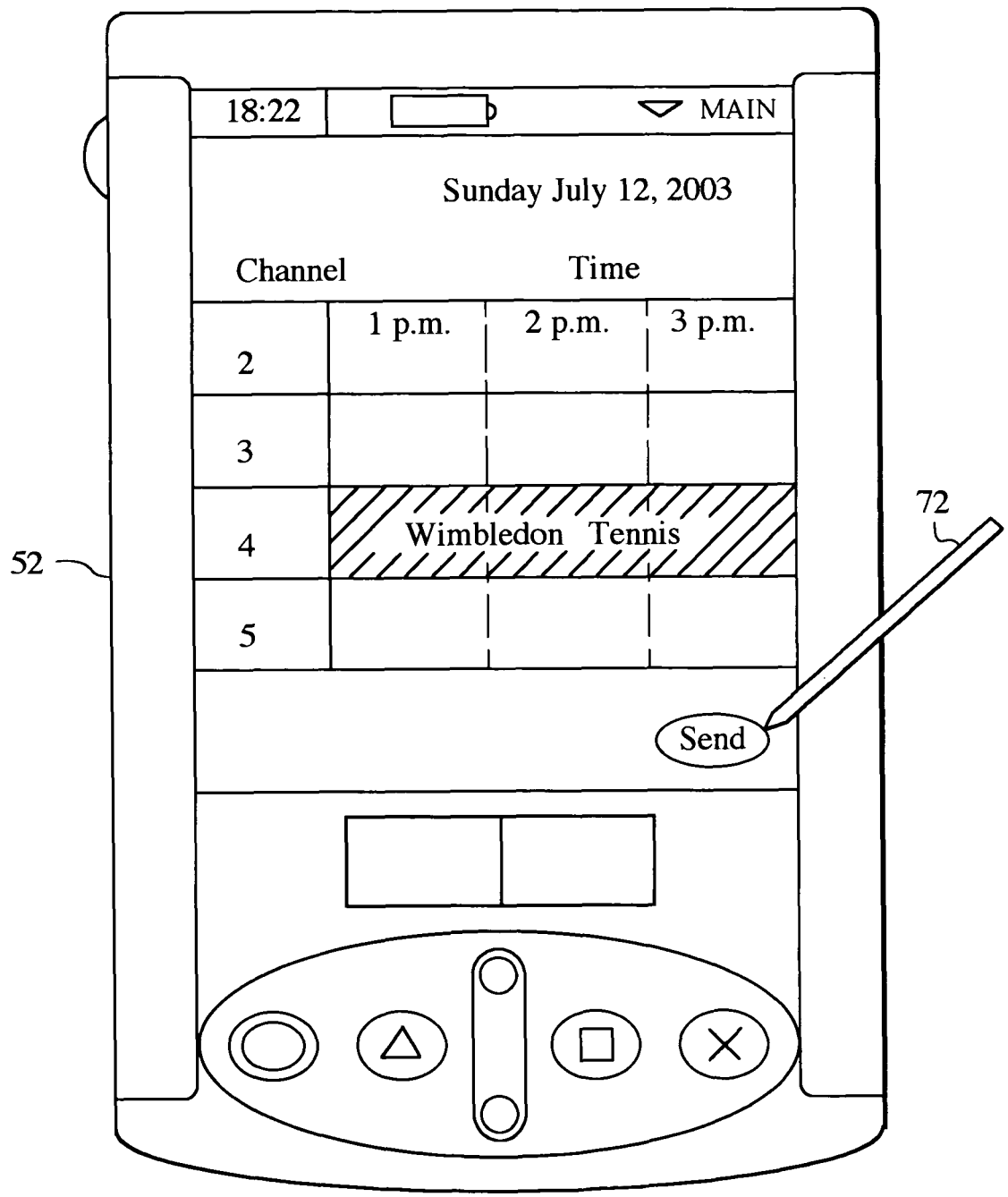
Figure 4C:
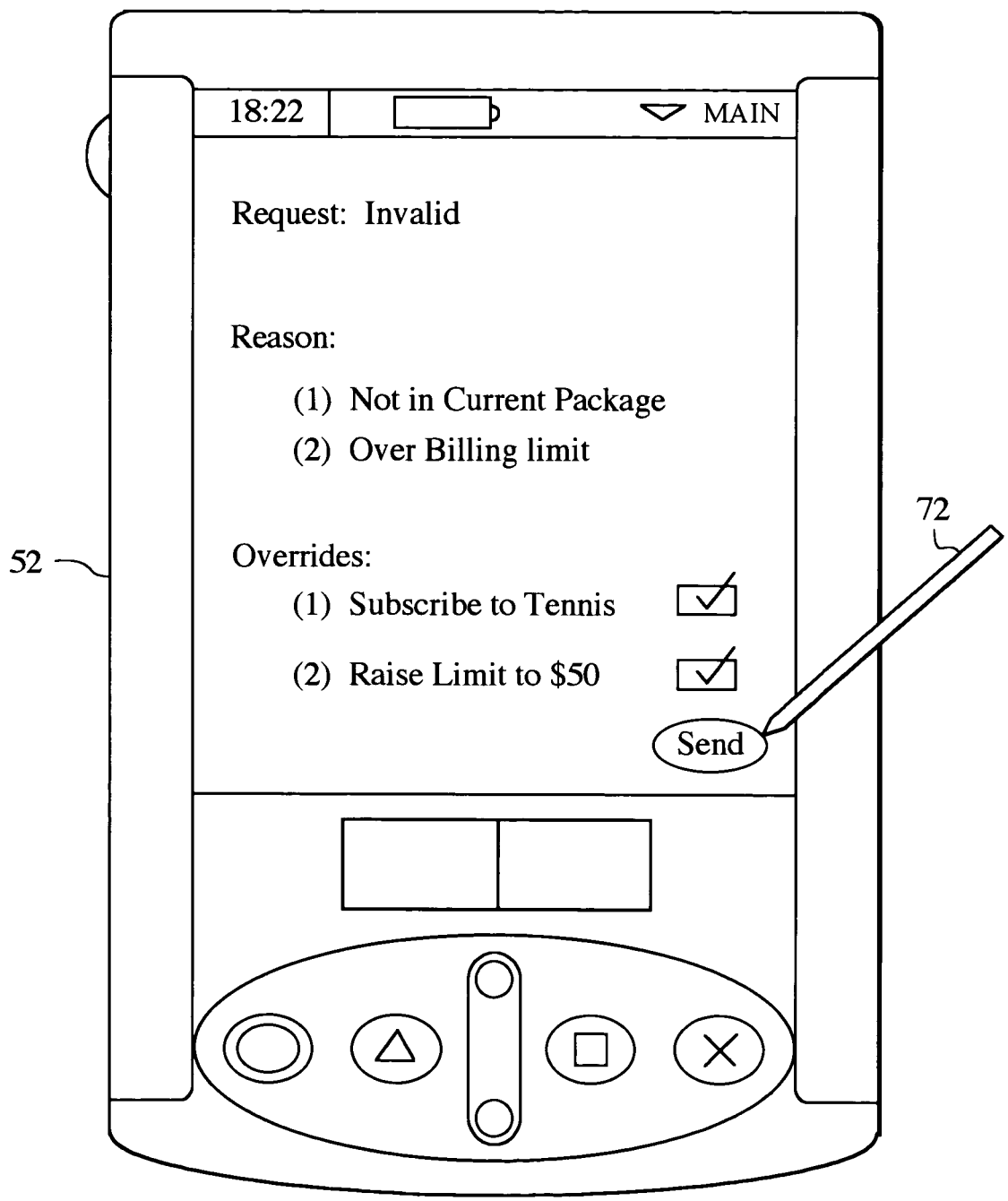
Figure 4D:
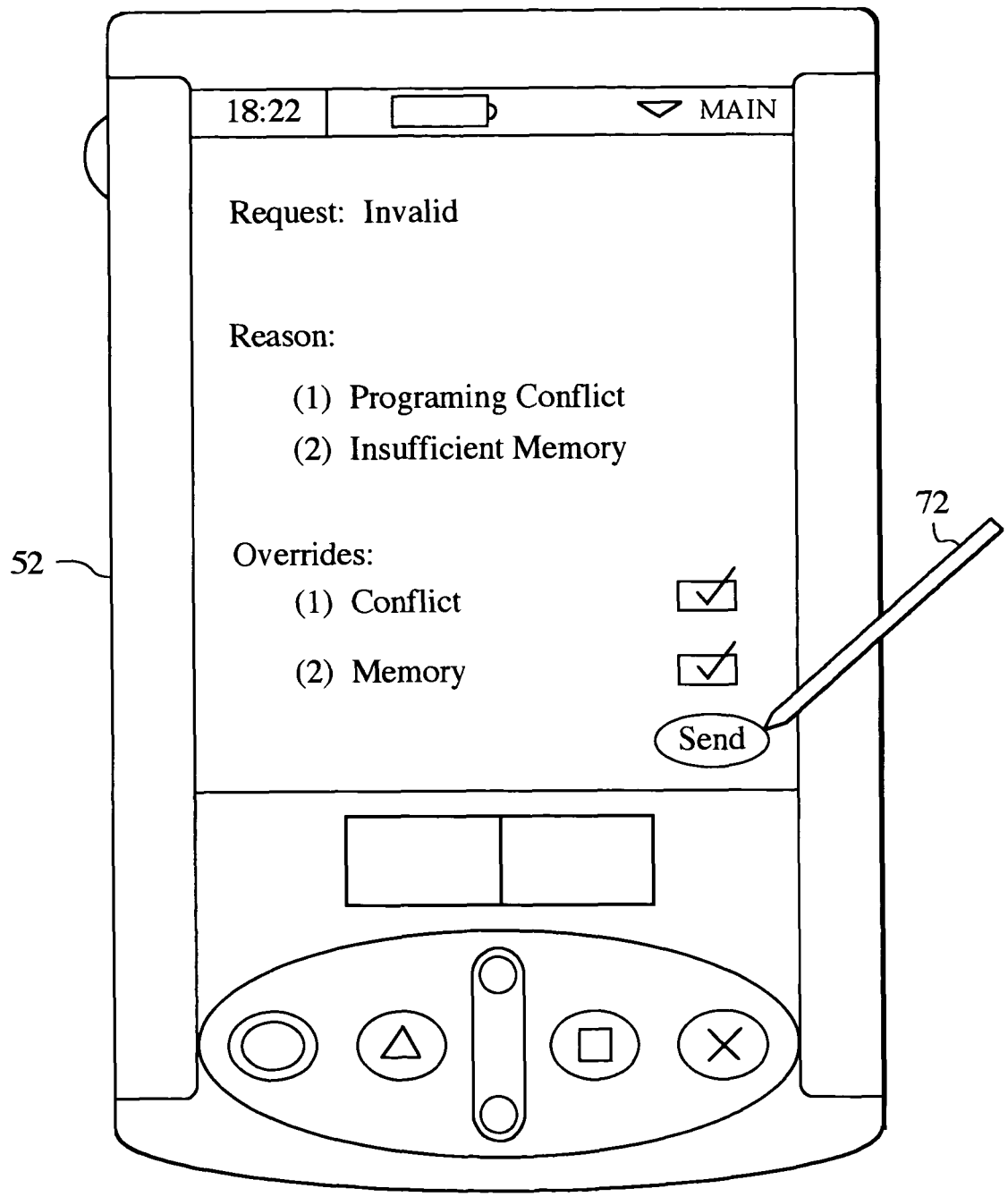
Figure 4E:
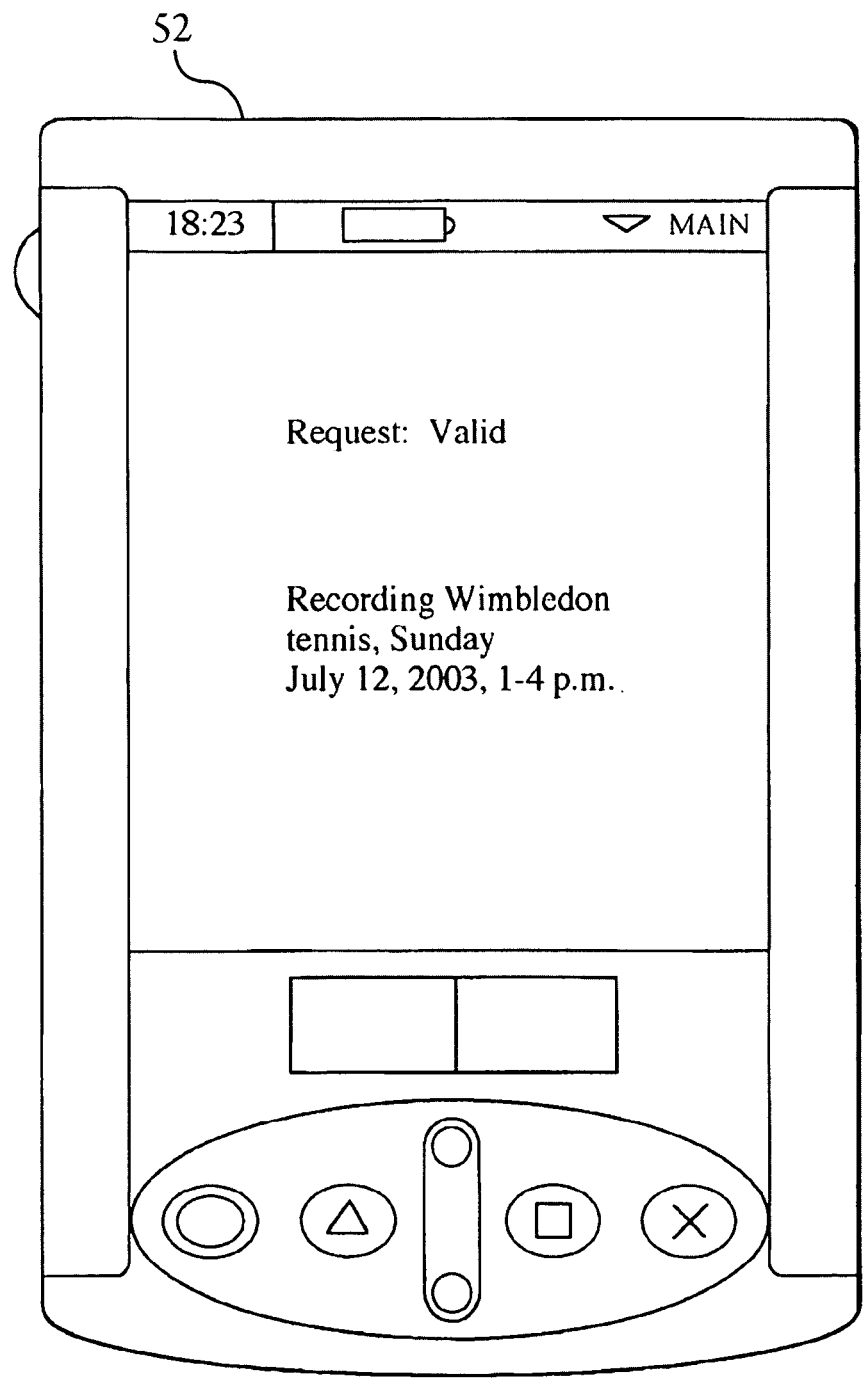
Figures 5, 6A:
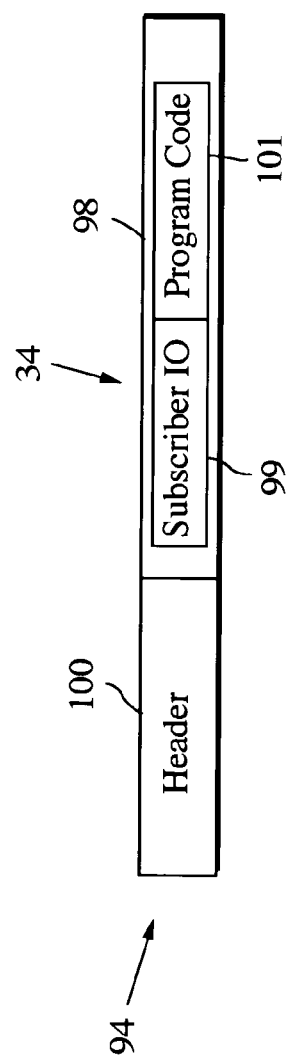

The specific sequence of steps involved in initiating, delivering, validating and verifying a remote record request are illustrated by way of a specific illustrative example in FIGS. 3a and 3b with reference to FIGS. 4 through 6. In this example, the subscriber has left home and forgot to set the DVR to record the tennis finals under trademark WIMBLEDON as he had promised his wife and daughter. Our subscriber is standing on the $4^{th}$ tee of his favorite golf course when he realizes he forgot to set the DVR and the match starts in only 30 minutes. Unbeknownst to our subscriber, the tennis under trademark WIMBLEDON is now carried on a pay-per-view tennis channel outside his standard subscription, his older son has already programmed the DVR to record a conflicting program and the DVR hard disk is almost full.

To initiate a remote record request, our subscriber removes his wireless PDA 52 from his golf bag and logs into the service provider's system (step 70). As shown in FIG. 4a, the subscriber uses a stylus 72 to select the "TV Program Guide" icon 74 on the display screen 76 of his wireless PDA 52. The system verifies the subscriber or PDA ID as valid and as having an active service program that supports remote record requests. If the subscriber's current package does not support remote requests, the subscriber is prompted to add that service and continue. Assuming proper validation, the subscriber is provided access to account information and an additional link is opened up to allow the subscriber to review an interactive program guide (step 78). Alternately, the program guide could be downloaded off-line and then accessed at a later time. In this case, the request capability is either validated when the guide is downloaded or at the SBC when the request is made.

The subscriber works his way through the screens of the program guide to the tennis program under trademark WIMBLEDON as shown in FIG. 4b, selects the program, selects record program once or all occurrences, and hits send (step 80). Feeling relieved, the subscriber turns his wireless PDA to vibrate, sticks it in his pocket and proceeds down the fairway.

Meanwhile, the remote record request is directed via the internet, wireless network or some other means 56 to the secure I/O port 58 in satellite broadcast center 12 (step 82). SBC 12 receives the remote record request 57 (step 84). Validation switch 60 confirms that our subscriber is in fact a subscriber, confirms that the selected tennis program does not exceed any rating limits but rejects the request because the "tennis package" is not part of the subscriber's current package and the tennis program under the trademark WIMBLEDON have a premium charge of $34.95, which is above the one-time billing limit. The broadcast center formulates a verification response that (a) rejects the request, (b) indicates why the request was rejected, e.g. outside package and exceeds billing limit and (c) prompts the subscriber to sign up for the required package and increase the billing limit (step 86). This response is relayed back to the subscriber in near real-time over the same or different wireless connection to the subscriber's wireless PDA causing it to vibrate in the middle of the subscriber's backswing.

Showing great composure, the subscriber stops his swing, answers the PDA, presses the blinking message icon and is presented with the rejection message as shown in FIG. 4c. The subscriber quickly checks the boxes to purchase the tennis package and to override the billing limit and hits send (step 88). The billing center records the new package subscription and spending override and validates the request (step 90). The new package and billing limit info is sent out to the subscriber IRD immediately in an MPT packet to update the settings in the subscriber's CAM.

Once validated, the programming request (program code), any override information and the subscriber ID (CAM ID, IRD ID or subscriber ID) are directed to bridge router 32, which creates an MPT packet 34 (FIG. 5) (step 92) with a unique packet ID number for each recording request. The uplink system 36 inserts the MPT packet into a transport packet 94 as shown in FIG. 5, which, in turn, is inserted into the broadcast chain along with the audio, video and CA transport packets for delivery to the subscriber sites (step 96). The transport packet includes a payload 98, e.g. the MPT packet 34, and a header 100 that specifies the payload is an MPT packet including a subscriber ID 99 and a program code 101. Since it is not possible to know what transponder the subscriber's IRD is currently tuned, the transport packet is broadcast out on all transponders in the satellite to ensure delivery (step 102). This is necessary to prevent any service or recording interruptions in case the subscriber IRD is already in the process of recording an event. The remote record request can be cycled into the broadcast several times in a given duration to help assure receipt in case of signal interruption, such as rain fade. Since the MPT packet has a unique ID, and the IRD validates the MPT packet, the IRD will ignore all subsequent MPT packets with the same ID.

Upon receipt of a transport packet carrying an MPT packet 34 with a remote record request, the IRD 42 determines that it is an MPT packet, decodes the packet and compares the subscriber ID in the packet to similar ID information resident in the IRD to determine whether the remote record request is directed to that subscriber site (step 103). Once the IRD confirms that the requesting subscriber and the subscriber IRD match, the IRD validates the programming request (step 104). In no particular order, the IRD validates the program code, revalidates that the requested program is included in the subscriber's package (optional), revalidates that the request does not exceed the billing limit (optional), validates that the request does not conflict with a pre-existing request and validates that the DVR has enough memory to store the programming.

In our example, the program number 123456 is a valid number, the premium fee of $39.95 is less than the newly updated one-time billing limit of $50 and tennis package (Service Code 49) is included in the newly updated service package. However, the request to record from 1-4 pm on Sunday unfortunately conflicts with a pre-existing request to record from 3-5 pm on Sunday and the DVR is running out of memory, only 300 Mb left and 1 Gb required for the recording as illustrated in FIG. 6a. Depending upon the override status of the current request, the IRD will either override the earlier request and delete old or low priority programming from memory to process the current request or will send a "request unsuccessful" message back to the subscriber, suitably via the satellite broadcast center, asking him to make an override decision (step 108). In his hurry our subscriber had not checked the override box, so a message is sent in near real-time to the subscriber's wireless PDA causing it to vibrate once again. While waiting his turn to putt, our subscriber answers the PDA, clicks the message icon, reads the message indicating a "programming conflict" and "low memory", quickly clicks "override" and sends the message as shown in FIG. 4d (step 110 FIG. 3b).

The override message is directed to the I/O port 58, validated, formatted into an MPT packet 34, inserted into a transport packet and uplinked into the broadcast stream (step 112). The IRD downloads the transport packet, decodes the MPT packet, validates the subscriber, processes the override request by deleting the earlier request and deleting the oldest or lowest priority programming currently saved on the DVR and programs the DVR to record the tennis program under trademark WIMBLEDON (step 114). As shown in FIG. 6b, the necessary overrides have been set. The IRD then issues a "request valid & executed" message, which is routed to the subscriber (step 116). Now on the $5^{th}$ tee, the subscriber answers his PDA, clicks the message icon and is relieved to see verification, as shown in FIG. 4e, that the tennis match under trademark WIMBLEDON is being recorded on time as promised (step 118). The verification may also provide other account information such as current billing, other record requests, memory left, executed overrides, etc.

As this example illustrates, the capability to provide near real-time response and verification of the request are critical elements in any commercially successful remote programming service. Almost by definition, the remote record request will be used when a subscriber forgets to program the DVR or is running late. Near real-time service and ability to interact via verification messages is a must in these circumstances. By using commercially available wired or wireless internet and by inserting the request in standard packets in the satellite broadcast stream, the initiation, delivery, validation and verification of a remote record request can be done in near real-time. Furthermore, by validating at the program guide, billing center and subscriber IRD, the subscriber can be provided with timely and informative messages that allow him or her to expand their subscription package, override rating or spending limits, override conflicting programming and override space limitations on the DVR on the fly and in near real-time.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of sending a remote record request to a recording device in a broadcast system, comprising:
    logging in to a system coupled to a broadcast center in the broadcast system with a wireless communications device;
    accessing a programming guide for the broadcast system with the wireless communications device;
    selecting a program for recording on the recording device and submitting the remote record request to the broadcast system, the remote record request comprising a program code and a subscriber ID;
    sending the remote record request to the broadcast center;
    verifying, at the broadcast center, that the subscriber ID is valid and the program is within a current subscription package within the broadcast system;
    communicating a verification response to the wireless communications device rejecting the remote record request when the program is not within the current subscription package or is above a billing limit or rating limit;
    communicating an override signal from the wireless communications device to the broadcast center to override the package, billing limit or a rating limit;
    inserting, at the broadcast center, the remote record request into a broadcast stream in response to the override signal;
    transmitting the broadcast stream within the broadcast system;
    receiving the broadcast stream at a plurality of subscriber sites;
    determining whether the remote record request in the broadcast stream is directed to the receiving subscriber site by comparing the subscriber ID to a subscriber site ID; and
    validating the remote record request at the subscriber site by determining whether the selected program can be recorded.

2. The method of claim 1, further comprising sending a verification response from the subscriber site to the wireless communication device.

3. The method of claim 2, wherein the verification response comprises affirmation of receipt and successful initiation of recording the program in the remote record request.

4. The method of claim 1, wherein inserting the remote record request into a broadcast stream further comprises:
    inserting the remote record request into a MPT packet; and
    inserting the MPT packet into a transport packet in the broadcast stream.

5. A broadcast system, comprising:
    a broadcast center, for receiving remote record requests comprising a program code and a subscriber ID from at least one wireless communications device, wherein the broadcast center verifies that the subscriber ID is valid and a selected program is within a current subscription package within the broadcast system, communicates a verification response rejecting the remote record request to the at least one wireless communication device when the selected program is not within the current subscription package or is above a billing limit or rating limit, receives an override signal from the at least one wireless device to override the current subscription package, billing limit or rating limit, inserts the remote record request into a broadcast stream in response to the override signal, and transmits the broadcast stream within the broadcast system;
    a plurality of receivers receiving the broadcast stream from the broadcast center, wherein at least one receiver in the plurality of receivers comprising a recording device, wherein the at least one receiver determines whether the remote record request in the broadcast stream is directed to that receiver by comparing the subscriber ID to a receiver ID and validates the remote record request by determining whether the selected program can be recorded on the recording device at the receiver.

6. The broadcast system of claim 5, further comprising sending a verification response from the receiver subscriber site to the wireless communication device.

7. The broadcast system of claim 6, wherein the verification response comprises affirmation of receipt and successful initiation of the remote record request.

8. The broadcast system of claim 6, wherein the verification response comprises a rejection of the remote record request.

9. The broadcast system of claim 8, wherein the verification response further comprises a conflict message explaining the rejection of the remote record request.

10. The broadcast system of claim 5, wherein inserting the remote record request into a broadcast stream further comprises:
    inserting the remote record request into a MPT packet; and
    inserting the MPT packet into a transport packet in the broadcast stream.

* * * * *